C. S. BROWN.
TRAP FOR SEPARATING FLUIDS OF DIFFERENT CHARACTERISTICS AND PARTICULARLY FOR SEPARATING LIQUIDS AND GASES FROM VAPORS.
APPLICATION FILED APR. 30, 1912.
1,163,316. Patented Dec. 7, 1915.
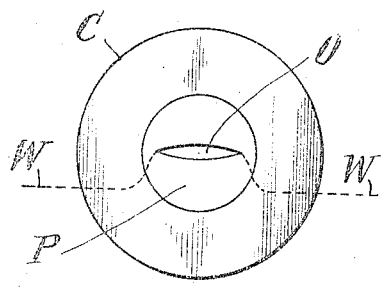
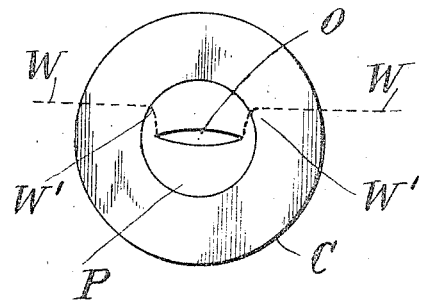
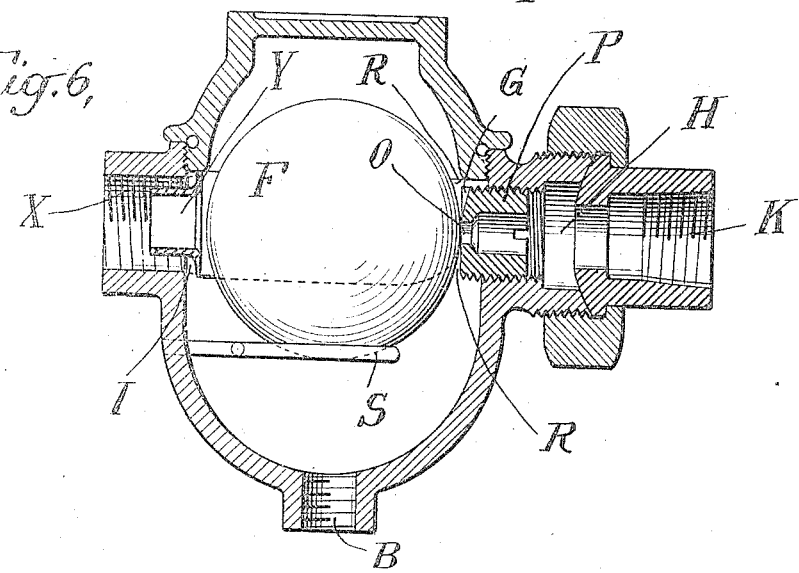
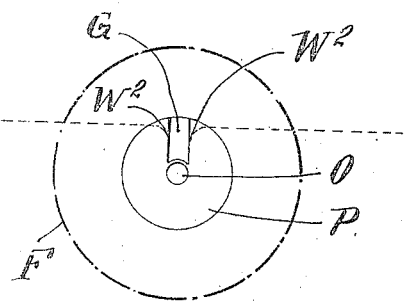

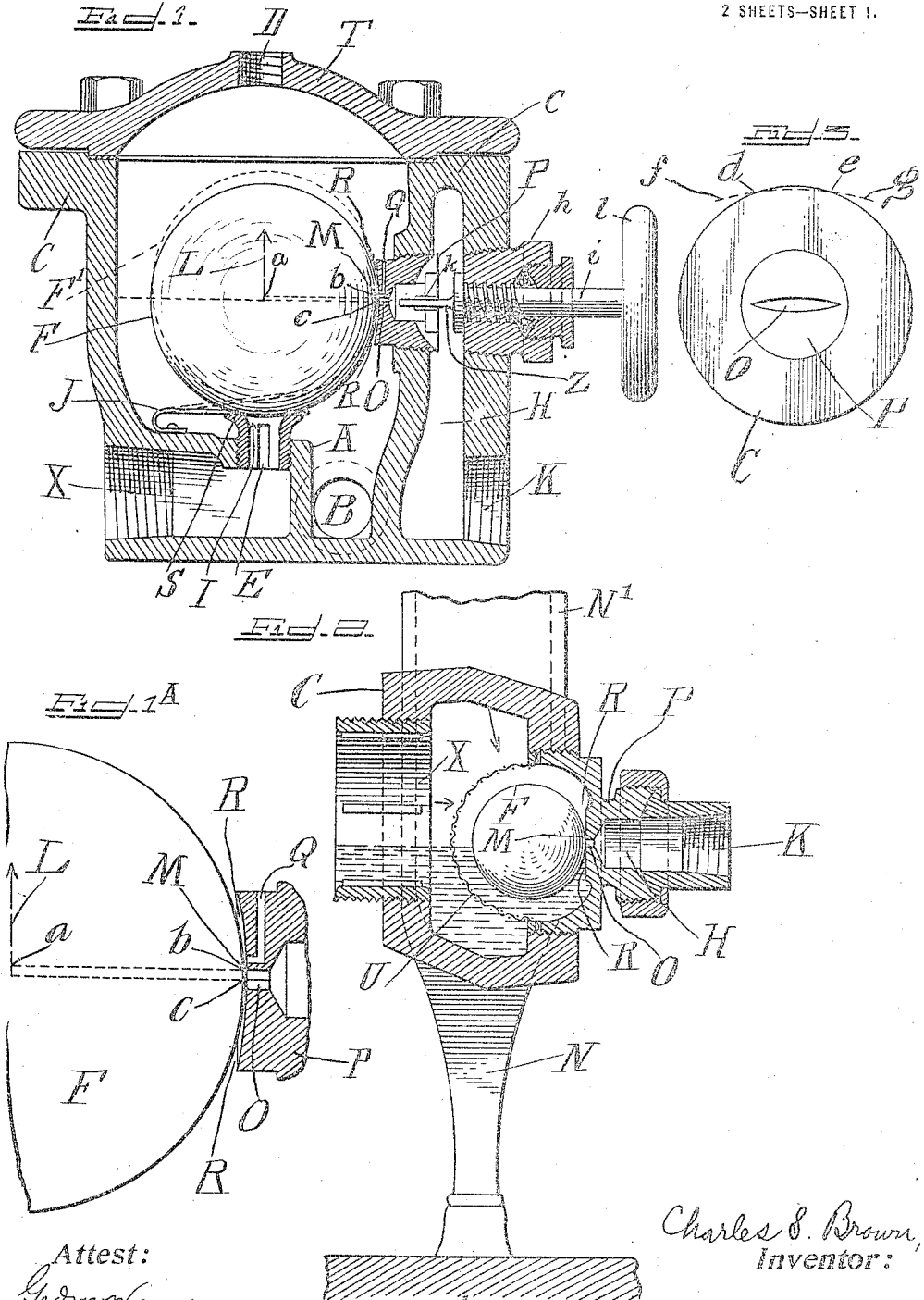

UNITED STATES PATENT OFFICE.

CHARLES S. BROWN, OF NASHVILLE, TENNESSEE.

TRAP FOR SEPARATING FLUIDS OF DIFFERENT CHARACTERISTICS AND PARTICULARLY FOR SEPARATING LIQUIDS AND GASES FROM VAPORS.

1,163,316.  Specification of Letters Patent.  Patented Dec. 7, 1915.

Application filed April 30, 1912. Serial No. 694,196.

*To all whom it may concern:*

Be it known that I, CHARLES S. BROWN, a citizen of the United States, and a resident of Nashville, county of Davidson, and State of Tennessee, have invented a new and useful Improvement in Traps for Separating Fluids of Different Characteristics and Particularly for Separating Liquids and Gases from Vapors, of which the following is a specification.

This invention relates to a trap for separating fluids of different characteristics, and particularly for separating liquids and gases from vapors.

It is particularly adapted for use in combination with steam plants or steam heating apparatus for the purpose of separating the water of condensation and the air from the steam, and permitting the escape of the water and the air from the system while preventing the escape and the loss of the steam. The invention is applicable, however, to the separation of other liquids from other gases or vapors.

The invention also includes features of construction which are designed to check the back flow into the system or apparatus of the liquids or fluids which are being separated.

The object of the invention is to produce a simple structure efficient in executing any or all of the functions of the device hereinafter described.

The invention consists in certain features of construction and in the combinations thereof, which are particularly recited in the claims.

One feature of the invention consists in providing a rolling valve which is placed or contained in a suitable casing arranged to receive the fluids to be separated, and which valve is adapted to be rolled across a lateral outlet orifice in the casing by the rising or falling of the liquid, whereby the outlet orifice is opened or closed partly or wholly according to the amount of liquid which is accumulated in the casing, so as to permit the liquid to escape when it has risen to or above a certain level while preventing the escape of one or more gases or vapors.

Another feature of the invention consists in forming the coöperating surfaces of the valve and orifice nozzle, so as to produce a space between them in which the pressure in the liquid is gradually reduced as the liquid flows through it to the orifice adapting a portion of this space for the passage of gases, or leading into it, as the operating conditions may require, a passage of lower impedance than that of the pressure reducing space for the passage of gases from above the normal liquid level to the orifice.

Another feature of the invention consists in providing a thermostat so arranged as to move the valve away from the outlet orifice when the contents of the casing are cooled.

Another feature of the invention consists in combining the devices already mentioned with a radiator or heater so as to permit the escape of the water of condensation and the air, while preventing the escape and loss of steam. The invention also consists of other features and combinations of parts which are hereinafter set forth.

Of the drawings, Figure 1 is a vertical section to one-half scale of an embodiment of the various features disclosed and claimed, the section being taken through the center of outlet O at the right; Fig. 1$^A$ is an enlargement of the portion of Fig. 1 in the vicinity of outlet O; Fig. 2 is a similar section showing the device in combination with a radiator or heater; Fig. 3 is a front elevation looking from the interior of the casing of Fig. 1 to the right toward the nozzle P; Figs. 4 and 5 are views similar to Fig. 3, and diagrammatically illustrate the action of the invention; Fig. 6 is a view similar to Fig. 1, of a modification, and Fig. 7 is an end view of the nozzle P shown in Fig. 6 looking from left to right, and showing the form of the passage G and illustrating the action of the apparatus at a certain liquid level.

The apparatus shown in the drawings is particularly adapted for use in connection with a steam plant or a steam heating system, in which the water of condensation and air are to be separated from steam, and the apparatus will be described as it would operate if used for this purpose. Nearly all prior devices for this purpose have permitted the escape of excessive amounts of steam, either wastefully, or in such a manner as to interfere with the successful operation of the heating system. With this invention the steam-trapping action is very efficient, and in the preferred forms the amount of steam escaping into the return piping is practically negligible, as shown by the fact that the temperature of the discharged water falls rapidly within a few feet after passing the device.

The principal functions of structures embodying the invention when combined with a radiator or heater, are to separate the water from the steam, and to separate the air from the steam. The air and water may be separated respectively by different means or through different outlets, but in the preferred construction both air and water are removed through the same outlet. The non-return or check valve function need not be employed, and in many cases the structure is not intended to be adapted for the exercise of such function, as, for example, in Fig. 2.

Referring to the embodiment of my invention shown in Fig. 1, the casing C may be the radiator or heater itself, or other equivalent, in some instances, or a part of the same, as in Fig. 2, but as shown in Fig. 1 the casing may be separate, and provided with a detachably secured top T. Even in the case of Fig. 1, however, the casing is in free communication with the system to be trapped. The inlet into casing C from the radiator is the orifice I communicating with the passage X. Orifice I may be at any part of the casing, but is shown as the orifice of a passage through a stop or rest S, which is adjustable in casing A. The outlet orifice for water, and for air when desired, as preferred, is at O in nozzle P, this location laterally of its coöperating valve, such for example as float F, and approximately on the horizontal meridian of the float, being of particular significance as hereinafter explained, especially in connection with the relative proportions of the said outlet orifice and of the valve-controlling float, and also in connection with other features to be described. The orifice O communicates with the passage extending through the plug or nozzle P, into the chamber H, which is provided with an outlet K adapted to be connected to the return to the steam boiler. The plug P is screw-threaded as shown in Fig. 1, and is adapted to be screwed into a screw-threaded opening in a wall in the casing which separates the interior of the casing from the chamber H (see Fig. 1).

$h$ is a screw-threaded plug which is adapted to be screwed into an opening in the outer wall of the casing. This plug is provided with a central opening which is screw-threaded and which is adapted to receive the screw-threaded stem $i$ which carries at its inner end the cleaning pin Z. The pin Z passes through a bearing in a bridge piece $k$ which extends across the outer end of the plug P. The stem $i$ is provided with a handle L. By turning the handle L the stem $i$ can be screwed inwardly and the pin Z can thus be screwed into the small orifice O to force the float F away from its seat and permit the blowing through of steam for cleaning out the orifice. The stem $i$ is provided with any suitable form of stuffing box or gland to make it fit tightly in the plug $h$. B is a passage leading directly from the inside of the casing C providing means whereby the sediment may be blown out which may collect in the bottom of the casing.

The plug P has its inner face curved as shown in Figs. 1 and 1$^A$, the curvature of this surface being of a greater radius than the curvature of the float or ball F. This curved surface extends outwardly from and around the outlet orifice O. The plug P is provided with a small passage Q which extends from the upper surface of the plug to a point near the upper edge of the outlet orifice O by means of which air may escape from the upper part of the casing through the outlet orifice O.

J represents a thermostatic device made in any ordinary form, so constructed that when it is cold it will assume the position shown in dotted lines in Fig. 1, and will thereby hold the float F in a raised position so as to open, or partly open, the orifice O, and thus permit the escape of fluids, and when it is heated, as by steam, it will assume the position shown in full lines in Fig. 1, and will permit the float F to close the opening O.

With pressure in the radiator, and in the casing C, and sufficient liquid to support the float F, the latter will seek the point of minimum pressure, i. e., the orifice O, and be held on its seat on orifice O by the steam pressure and by its buoyancy, thus closing said outlet orifice to all discharges except normal leakage. This closure will be maintained until the buoyancy of the float due to accumulated condensation and consequent higher water level, reaches the critical point of balancing the pressure or force which is maintaining the closure, which force is the difference between the pressure inside the casing and that in the outlet passage O.

The actual operation, as visually observed by me through glass, in demonstration of the invention, is as follows, when the rate of condensation is greater than any slight normal leakage through orifice O: As the water of condensation accumulates in the trap, the float is raised to open O slightly at its lower edge, and the float remains fixed in such position, permitting the constant discharge of water during a constant rate of condensation. If such rate increases to such extent as to cause a material increase in the height of the water level, the float, upon the attainment of a definite higher level, is suddenly rolled up from its seat on the orifice and caused to float relatively free, the water rushing out through O. The float then gradually returns to an approximate seat over the orifice, as the water level falls. If the increased rate of condensation is maintained, the above action continues intermittently, the frequency being dependent on the rate of condensation, in attaining the level at which the forces are suddenly unbalanced.

One most serious defect in nearly all prior traps used for this purpose has been the inability to open the water outlet against high steam pressure, in cases of devices which satisfactorily conserved the steam. One of the principal features of my invention whereby the orifice is opened to permit discharge, against the tendency of even a very high steam pressure to maintain closure, is the construction and relative location and arrangement of the outlet orifice O, and, in certain related aspects, of the float F and also of the nozzle P. In the first place, the orifice O is not only laterally disposed with reference to the float, but it is of quite small diameter relative to the size of the float, although it may be of itself quite large. In an assumed example of a small sized device, the float may be four inches in diameter, and the orifice, which may be circular, may have a diameter of a quarter of an inch; and such a four-inch float is of such weight, i. e., about half a pound, as to have approximately one-half submergence in the water when floating free, and an approximate maximum buoyancy of half a pound when completely submerged in water; and the outlet orifice O is located at substantially the horizontal meridian of the float in its lower position shown. Under these conditions, and under the conditions of such high steam pressure as to hold the float with considerable pressure against the outlet orifice O, an increase of water level beyond a predetermined higher point will thereupon suddenly tend to lift the float and open the outlet for the escape of water. The increasing water level, tending to raise the float, creates an increasing force which acts as if concentrated at the center of gravity of the float in the direction of the arrow L, (Fig. 1), and exerts a turning moment through the lever-arm $a$—$b$ of the float on the fulcrum or instant axis M, fixed frictionally by the steam pressure; and as said fulcrum M is on the upper edge of the orifice O, the float F simply rolls suddenly up the face of the plug P to the dotted line position $F^1$, to open the outlet O to permit the escape of the water below the float, while trapping all but an immaterial quantity of the steam above it, as will be hereinafter described.

When the excess water has escaped, the float will return forthwith to its position of closure in which it is normally held by the steam pressure and by the remaining body of water. In all cases the orifice O should be quite small relative to the float, but it may be largest when in the particular location of maximum efficiency shown, i. e., at approximately the horizontal meridian of the float when the float closes the orifice. The importance, as to efficiency, of locating the orifice O as near as possible to said position relative to the float, will be appreciated from the following considerations, of the above specified conditions, bearing in mind that the difficulty in the past has been to insure the opening of the outlet in cases of high steam pressure. In the example of maximum efficiency shown, the turning moment on fulcrum M which is exerted by the buoyancy of the float, acting as a force concentrated at its center of gravity, is measured by the product of said buoyancy (assumed above to be half a pound) and the radius of the float (assumed above to be two inches); the result being one inch-pound, which is the power of the float to overcome the orifice-pressure. At a condition of balance, this power equals the moment of the effective orifice-pressure which effects closure at O.

The orifice-pressure acts as if concentrated at the center of gravity of the orifice O, so that its lever-arm relative to fulcrum M is $b$—$c$, one eighth inch in length, i. e., half the diameter of the orifice. The effective orifice pressure is the difference ($p$) between the pressure inside of the casing C and that in the outlet passage H, and its moment about the fulcrum M is measured by the product of the area of the quarter-inch orifice (one twentieth of a square inch) and the lever-arm $b$—$c$ (one-eighth inch), which product is obviously only one-hundred-and-sixtieth of the total difference in pressure, ($p$). Thus, since under the same conditions, the moment of flotation was unity, it is apparent that the pressure $p$ equals 160 pounds. That is, with the arrangement of maximum efficiency shown, (i. e., the orifice O at the horizontal meridian of the float), the float has the power to open the outlet against any steam pressure up to one hundred and sixty pounds. This would be much less if the outlet O were located materially below the horizontal meridian of the float, as then the effective lever-arm $a$—$b$ would be greatly reduced until finally it would become zero if the outlet were located directly beneath the float where there would be no turning moment on the edge of the orifice, and the buoyancy would act merely to pull the float directly upward from the orifice. In such a case, other conditions remaining the same as above, the float could not be lifted against a steam pressure of more than ten pounds, as that pressure would produce, on the assumed orifice of one-twentieth of a square inch in area, a pressure of half a pound, just balancing the buoyancy of the float. But even in the case of the location of maximum efficiency shown, the float and the orifice O are to have some such relative proportions, as above described, dependent upon the operating steam pressure, the outlet having a smaller order of dimension than the float; because with a large orifice not only the total pressure on the orifice would be large, but its effective lever-arm $b-c$ would be increased, so that its moment might be sufficient to over-balance the relatively small moment of the float, particularly as the effective lever-arm $a-b$ of the float is materially reduced by a material increase in the size of the orifice. It is the combination of the relative proportions and the location of the float and outlet which produces the arrangement wherein the effective leverage of the buoyancy of the float to overcome the orifice pressure is directly proportionate to the ratio of the radii of float and orifice, whereby an increase in the ratio between the sizes of the two is accompanied by a correspondingly great increase in the efficiency of the above-stated action. The rolling action of the float on the face of the plug P, also insures maximum mechanical efficiency.

In the claims, the expression "lateral outlet" is used to define any lateral location of orifice O at, above or below the horizontal meridian of the float wherein a substantial or useful effect of the invention is obtained; but the most effective location of the orifice is usually on the horizontal meridian of the float, and this location of the orifice has been found most effective in separating and discharging air as will be described hereinafter.

The term "lateral outlet" also includes an orifice of any shape. For example, the above calculation of the capacity of a four-inch float to operate against a pressure of 160 pounds, was based on an assumed orifice of a quarter inch diameter which in form was circular. But the lever-arm $b-c$ may be reduced to one-half of its former length, from one-eighth inch to one-sixteenth inch, (thus doubling the leverage), without changing the orifice area, by a fifty per cent. reduction of the vertical diameter of orifice O, and by such an increase in its horizontal dimensions as to produce the same area as before, i. e., one twentieth of an inch. Thus, by an elliptical orifice O, such as shown in Fig. 3, the float can open the outlet against any steam pressure up to three hundred and twenty pounds, twice that with a lever-arm $b-c$ of double length. This elliptical form of orifice conforms (Fig. 3) to the intersection $d, e$ of a spherical float F, with a cylindrical surface $f, g$ as embodied in a nozzle made with its operating surface a section of a hollow cylinder with a vertical axis, and radius of curvature greater than that of the float F, as diagrammatically illustrated in Fig. 3, the elliptical orifice fitting the surface of the spherical float as perfectly as the circular orifice.

It is desirable that the action of the float should be prompt in closing the outlet-orifice forthwith on occasions when steam may escape. That is, the float valve should be maintained in position vertically near orifice O so that the advent of steam pressure will force it tightly against the orifice, to prevent the escape of steam from above or below the float. The float can be kept low enough, to prevent steam escape below it, by making it sufficiently heavy to have sufficient inherent submergence. This will prevent the escape of steam during an interval which would otherwise be required for the steam pressure to sink the float to its closing position or to blow out water to decrease the water level at which the float closes the orifice. But in small devices using small floats, particularly of more than half submergence, some means should be provided to insure prompt closure, and prevent escape of steam through orifice O above the float. In such cases, under conditions of low water level, the heavy float may fall so as to open the top of orifice O sufficiently to permit the free escape of steam. The rapid flow of steam over or through the water would tend to atomize the water, carrying it out in the form of spray and yet further reducing the water level so as to leave the float entirely unsupported and orifice O wide open until condensation again established the normal operative water level. Such occasions would be especially liable during periods when the steam pressure might not be sufficiently high to materially aid the water level in maintaining the float in closing position. In such cases the stop S may be employed to prevent the float from falling below a position where the advent of steam can promptly close the outlet orifice. The stop S may be sometimes externally threaded as shown in Fig. 1, and provided with a slot $k$ for the reception of an adjusting instrument, and may be usually set so that when the float rests on it, the orifice O will be entirely closed. Or the stop S may be set so that orifice O may be open slightly at the top in cases where it is desirable to drain the system quickly of air by way of orifice O. In the latter case, the slightly lowered stop permits of the vertical oscillation of the float when in action, changing momentarily the fulcrum M from the top to the bottom of the orifice O and causing a slight opening at the top of the orifice, thus facilitating the escape of air.

A means which I have found particularly effective in small devices which are inherently slow in discharging air, and in discharging water, is the thermostatic device or strip J of Fig. 1, constituting a stop for the float which can, if desired, be used either with or without stop S, and in a case where inlet I may be at another part of the casing C than the bottom location shown. At times when there may be no steam in the casing, but when there may be cold water, and particularly air, which should be discharged, the strip J is cool, and assumes an elevated position, shown in dotted lines, compelling the float to rise, independently of its own tendencies, into or above the dotted line position F¹, so as to open O wide and permit the rapid discharge of air, and also of any water which is high enough to pass out. As soon as steam, or hot water from which steam might arise, enters the casing, the strip J, heated thereby, is caused to assume a lower position, thereby freeing the float and permitting it to exercise its normal function. The strip J need not, as shown, act as a bottom stop, however, but may be located at any place where its extension would force the float from the orifice O. When the inlet I is located at the bottom, as shown, it permits the float to be agitated by incoming air so as to open O to let the air escape. The strip J can, of course, be used with any form of the float-controlled valve device of this invention.

In addition to permitting the escape of water, while trapping substantially all the steam, this invention provides an efficient means for permitting the escape or separation of gases, or of aeriform fluids such as air. This function is particularly due to the location of the lateral outlet orifice O approximately at the water level. The invention has been described above as to the water or liquid exit chiefly, and as if the orifice O were simply in a tube or pipe, without the extended adjacent surfaces shown. The structure will now be described with reference to its aeriform-fluid separating functions.

In this invention, the relatively small lateral outlet orifice O promotes the escape of air with but immaterial escape of steam, by reason of the fact that it is located at, or slightly above, or slightly below the horizontal meridian of the float, so that the water will not trap the air as in the case of a deeply submerged or bottom outlet, but so that when the water escapes, the air will escape also, while only relatively minute amounts of steam will be lost. This action is materially assisted by the construction of the coöperating end of nozzle P, which, instead of presenting merely the orifice O with a narrow edge, or such an orifice with sides sloping away from the float, has a broad extended end surface as clearly shown. This extended face of the nozzle forms, in conjunction with the float, a narrow or thin annular recess R between the float and nozzle face. This recess or passage extends entirely around the orifice O, and communicates with the space above and below the water-level. It is this recess or passage R which permits the separation and escape of the air, which passes through it *en route* to orifice O. The concavity of nozzle P (as shown in Fig. 1), is desirable in providing a thinner recess for the water film than a flat face would provide; and at the same time the float (when used as a valve) may have a definite rolling action, as on a flat face, since the hollow face of the nozzle is of larger curvature than that of the float.

Two different physical actions appear to be involved in the process of air-separation, according as the water level may be above or below the orifice O. In Fig. 4 is illustrated the action of air-separation in the case of a water level below the orifice O, the viewpoint being toward the right of the interior of Fig. 1, as in Fig. 3. The water level, shown at W, takes the form of a thin film rising on the face of the nozzle in the recess R between the nozzle and the float. This is due to the familiar phenomenon of the tendency of water to creep into chinks and crevices, and climb to a height dependent upon the proximity of the two surfaces, such as P and F. The water film does not entirely surround orifice O, but leaves its upper part free, as shown in Fig. 4, so that upon the lifting of the float, and opening of the orifice, a very small passage is formed for the free exit of the air, at the top of the orifice. The air first passes down from above water level W, through the thin recess R above orifice O between the float and nozzle. This thin passage affords a downward path of low impedance for the air except when the water level might be so high as to flood the passage, which latter need not be the case in a well-designed embodiment of the invention. As soon as the air reaches orifice O, it escapes therethrough.

In Fig. 5 is illustrated the action when the water level which opens the orifice, is materially higher than orifice O. In this case the water level takes the form indicated by the dotted lines W—W, dipping down at W' W' where the float and nozzle approximate contact with each other. This dipping down of the water line is due to the fact that the water that gets into this recess can pass out through the orifice more rapidly than it can be supplied through the narrow openings to the space below the points W' W'. This action may be accentuated by providing the artificial channel G, (Figs. 6 and 7) so that even with an operative water level materially above orifice O, there will be a definite air channel, the channel G, however, being narrow, so that the water flowing past the channel will engage its vertical edges $w^2$ $w^2$, Fig. 7, without flooding the channel itself. As shown in Fig. 7, channel G extends downwardly to a point close to the edge of orifice O. The function of channel G, when employed, is to increase the insurance against an entire sealing up of orifice O by a water film, against air flow, and channel G does this because the flow of air through it sweeps down any moisture tending to collect in it. By the use of channel G, it is possible to prevent sealing of the orifice against outflow of air, even with an operative water level nearly as high as the upper periphery of the nozzle P, or as much as three quarters of an inch or more above orifice O. While this arrangement of nozzle permits the discharge of air with relative rapidity, the amount of steam discharged following the discharge of air is inappreciable in amount, experiments indicating a screening action due to the very small dimensions of the outlet for air, through which steam flows with materially greater impedance, it being a well known fact that steam passes through very thin passages, such as joints or cracks in pipes, much less readily than air. The passage R and channel G are controlled by the same valve (float F) which controls orifice O itself. The channel G is not always essential, in order to effectively discharge air; but is useful in increasing the efficiency of this action when the amount of air to be removed is large.

In any case where the structure is adapted to separate air in accordance with the invention, the air outlet D in cover T of Fig. 1 may be dispensed with.

If desired, an air shunt passage shown at Q in Fig. 1, may be employed for the air discharge. This passage Q, as shown, to larger scale in Fig. 1^A, has its lower end open toward the float F in close proximity to orifice O, being separated from it by a thin bridge of metal, only. In such case the air is compelled to pass through a very thin passage way between the float and nozzle on its way from the passage Q to the orifice O, which passage-way is controlled by the action of the float, and may be entirely closed in case the float rises so as to cover the outlet of the passage Q in the nozzle face. The advantage of shunt Q is that its upper end may be placed so high as to be above high water level and thereby it may be protected from the entrance of floating foreign matter which might otherwise stop it up. The shunt Q is also particularly useful with the concave nozzle P as in Fig. 1, for the discharge of air in cases of unusually deep water-submergence of orifice O. In such case the water film may rise so high in the thin recess R between the two surfaces, (which is particularly thin because both of said surfaces are of nearly the same curvature) as to entirely surround orifice O and seal it from air escape except by way of shunt Q. In this case the narrow metal bridge between orifice O and the lower end of shunt Q will be swept clear of the water film by the air passing through Q and escaping through O. Thus the air escape may be efficient even with a very high water level and the space R filled with water. This action has been observed with a water-submergence of O as great as ¾ of an inch. The depth of possible submergence, with sufficient air separation, is limited only by the difference in resistance to flow of air offered, on the one hand by the shunt Q and on the other by the water film in the recess R. Under conditions where the float may temporarily rise above the lower outlet of shunt Q, air may yet escape through Q, provided with its resistance to air-flow is less than that of the water film in R, and the air be carried thence with the water out through orifice O.

In Fig. 2 my steam trap is shown in combination with a steam radiator. In this figure N represents one of the legs of the radiator, and N' one of the sections of the radiator. The lower part of the radiator itself marked C, forms the casing of the trap. U is a screen which is suitably connected with the casing and which incloses the float F. It is adapted to prevent access to the orifice O of foreign matter that would not readily pass through it. The other parts of the trap shown in Fig. 2 are substantially the same as those already explained except that the form of the plug P' is made different, being made in such a form that it can be screwed directly into the side or end of the radiator. In this form of plug the surface surrounding the orifice O is a flat or plane surface as shown. In this form of construction the accumulation of the water of condensation in the radiator itself operates the float F and tends to roll it back and forth across the inner surface of the plug P, thereby opening or closing or controlling the outlet orifice O.

In Fig. 6 another modification of the invention is shown in which the inlet opening is so arranged relatively to the float as to prevent any back flow of the escaping fluids. In this form of valve the inlet X is placed at one side of the casing as shown, in line with the outlet orifice O. The inlet X is provided with an orifice Y which is large in diameter relatively to the float, and which is provided with a seat adapted to receive the float F. As the orifice Y is made large the float will be prevented from rolling upwardly over the edge of the orifice Y, but will be held against that orifice if there is any tendency for back flow of the fluid. The valve in this form is provided with a stop S consisting of a wire or rod projecting from the edge of the casing and shaped at its outer end in the form of a ring on which the float S rests when in its lower position. In this form the plug P is provided with a small air passage G which is shown in a front view in Fig. 7. This passage is deeper at the top as shown in Fig. 6, and gradually grows shallower toward its lower end.

An important feature of the air separating function of the invention is that it is operative over a wide range of steam pressures, while the escape of steam in material quantities is not necessarily increased by higher steam pressures. This is due to the fact that with the higher steam pressures the float is pressed against the orifice with greater force, materially reducing the area of the opening for the outflow of air or steam, at the same time the higher water level, necessary to operate the float against a higher steam pressure, assists in decreasing the area of the air or steam outlet by restricting the width of the passage to the orifice by increeping of the water film. While the velocity of air or steam outflow may be greater with the higher pressure, the reduction of area of outlet prevents material increase in flow over that produced by lower steam pressures, with consequent lower water level, and larger area of orifice open to air or steam discharge. The orifices of these devices are practically self-clearing, even where very small, the repeated, although slight oscillations of the float or valve operating to roll or grind such particles, so that they readily wash through the orifice O. Larger particles, by temporarily acting as fulcra, throw the float or valve away from the orifice, permitting an instantaneous increase of water discharge which sweeps the particles through the orifice. The orifice is preferably made short, (Fig. 1), as if in a thin plate, in order to facilitate passage through it of such matter.

The device as embodied in Fig. 1, is also a check-valve or non-return valve, preventing back-flow of water or steam from the return line. In case the direction of pressure in the system has been reversed, the water may tend to flow through O from the right, as a result of the closing of the radiator steam-admission valve with a continuation of pressure in the return line, or as a result of radiator vacuum from condensation therein. The body F, formerly tending to float, is then instantly sucked against the float or orifice I by the vacuum, if located, as shown in Figs. 1 and 6, so that the float can be drawn to it, assisted by the weight of F in the case of the bottom location of orifice I shown in Fig. 1, so as to effectually prevent the return flow of water or steam to the radiator. The presentation of orifice I as in Fig. 1 is advantageous in that being thereby beneath the float, there can be no turning moment of flotation, tending, as at O, to open orifice I against the orifice pressure. But n if there be such a turning moment, as a result of a change of the angular displacement of the orifice I from position illustrated in Fig. 1, as to its lateral location in Fig. 6, the area of the orifice I may be made sufficiently large so that the effective orifice pressure will not be overcome by such action; and orifice I, in position directly beneath the float, should in any case be made so large as to prevent the displacement of the float by back-water entering through O and impinging on the side of the float. The orifice I may be as large as the general structure may conveniently permit, as it is desirable for the steam-trap action to have the casing in as free communication with the radiator as if the latter were the casing itself, and indeed, it is contemplated that the radiator itself may be the casing, or a part of the casing, as in Fig. 2, and, in general, for the non-return or check-valve action, a larger diameter of orifice I will increase the closing power of the float on orifice I, and thereby, in conjunction with the sealing effect of the surrounding water, provide additional insurance against flooding the radiator. As soon as the normal condition of radiator pressure is resumed, the device will resume its normal steam-trap action. For either function, steam trap, or non-return, the inlet I may be at any part of the casing. But the stop S may be employed, whether or not I is located beneath the float, as in Fig. 6.

In cases where, as shown in Fig. 1, the inlet I is beneath the float, and where it is also desired to employ the adjustable stop S, as also shown in Fig. 1, the orifice I may be in the stop S as shown. While it is not necessary in other cases to have this arrangement whereby the float normally may be seated approximately against both orifices I and O, yet this is a simple arrangement involving several of the principal useful features of the invention, and this condition might exist independently of adjustability of support S.

In cases where the buoyancy of the float sufficiently over-balances the closing pressure at the outlet O, the float may rise and move as a free body in the dotted line position F¹, or about it, and on its return to normal position, present different surfaces to the orifice O. This action promotes uniformity of wear of the float so that its life will be long even if constructed of soft and thin material and without special wearing surfaces. The various surfaces which are presented to the orifices may be properly regarded as the valve, the rest of the float being the means controlling the valve. The edge of orifices O and I, and their adjacent surfaces, may be of hard bronze so that their life will be long. The larger sizes of float F are made in the usual manner, of hollow metal hemispheres brazed together at the meridian, but smaller sizes have been made of hollow glass spheres with included mercury for the desired submergence. The float need not be spherical, although that form is used in the best form of my invention.

It is manifest that the various features of the invention may be embodied in various structures which may resemble each other only in the inclusion of such feature or features.

In the claims, the word "fluid" is used to define and include all liquids, gases and vapors. The specification of the lateral outlet as to location approximately at the horizontal meridian of the float, means location not only precisely at the horizontal meridian of the float, but also at such location above or below such level as will be accompanied by any of the useful effects of the invention, such, for example, as the rolling effect, or where the buoyancy of the float has a definite moment, and such as the ability to permit the discharge of the air. From the description above, it will be clear that under various conditions such locations may be somewhat above or below the horizontal meridian of the float.

What I claim as new and desire to secure by Letters Patent is:—

1. A trap for separating liquids, or liquids and gases, from vapors which comprises a casing provided with a lateral outlet orifice, and a rolling valve adapted to be rolled across said orifice by the rising and falling of the liquid so as to control the orifice, and a discharge pipe leading downwardly from the outlet orifice.

2. A trap for separating liquids, or liquids and gases, from vapors which comprises a casing provided with a lateral outlet orifice, and a float adapted to roll across said orifice so as to control the same, and a discharge pipe leading downwardly from the outlet orifice.

3. A trap for separating liquids, or liquids and gases, from vapors which comprises a casing provided with a lateral outlet orifice, and a float adapted to roll across said orifice so as to control the same, the orifice being small relatively to the size of the float, and a discharge pipe leading downwardly from the outlet orifice.

4. A trap for separating liquids, or liquids and gases, from vapors which comprises a casing provided with a lateral outlet orifice, and a float adapted to roll across said orifice so as to control the same, the orifice being located approximately at the liquid level at which it is opened by the rising of the float, and a discharge pipe leading downwardly from the outlet orifice.

5. A trap for separating liquids, or liquids and gases, from vapors which comprises a casing provided with a lateral outlet orifice, and a float adapted to roll across said orifice so as to control the same, the orifice being located approximately in line with the horizontal meridian of the float when the float closes the orifice, and a discharge pipe leading downwardly from the outlet orifice.

6. A trap for separating liquids, or liquids and gases, from vapors which comprises a casing provided with a lateral outlet orifice, a surface extending from the periphery of said orifice, and a rolling valve adapted to be rolled across said surface by the rising or falling of the liquid so as to control the orifice and a discharge pipe to permit the escape of the liquid after it has passed through the outlet orifice irrespective of the pressure in the casing inside of the outlet orifice.

7. A trap for separating liquids, or liquids and gases, from vapors which comprises a casing provided with a lateral outlet orifice, a surface extending from the periphery of said orifice, and a float adapted to roll across said surface so as to control the orifice and a discharge pipe to permit the escape of the liquid after it has passed through the outlet orifice irrespective of the pressure in the casing inside of the outlet orifice.

8. A trap for separating liquids, or liquids and gases, from vapors which comprises a casing provided with a lateral outlet orifice, a curved surface extending from the periphery of said orifice, and a float having a curved surface, adapted to roll across said surface so as to control the orifice, the curvature of the float being sharper than the curvature of the surface on which it rolls.

9. A trap for separating liquids, or liquids and gases, from vapors, which comprises a casing having a lateral outlet orifice, and a freely floating valve for said orifice, the orifice being relatively small and located at approximately the horizontal meridian of the floating valve, and a discharge pipe leading downwardly from the outlet orifice.

10. A trap for separating liquids, or liquids and gases, from vapors, which comprises a casing provided with a lateral outlet orifice, and a spherical float adapted to roll across said orifice so as to control the same, and a discharge pipe leading downwardly from the outlet orifice.

11. A trap for separating liquids, or liquids and gases, from vapors, which comprises a casing provided with a lateral outlet orifice, a concave surface extending from the periphery of said orifice, and a spherical float adapted to roll across said surface so as to control the orifice, and form a thin passage between itself and the concave surface.

12. A trap for separating liquids, or liquids and gases, from vapors, which comprises a casing provided with a lateral outlet orifice, and a rolling valve adapted to be rolled across said orifice by the rising and falling of the liquid so as to control the orifice, and a thermostat adapted to roll the valve away from the orifice.

13. A trap for separating liquids, or liquids and gases, from vapors, which comprises a casing, a float inside the casing, and a relatively small lateral outlet closed by the float at a normal liquid level in the casing, said float being acted upon by a rise in liquid level to roll on the upper part of its seat as a fulcrum, and a discharge pipe leading downwardly from the outlet orifice.

14. A trap for separating liquids, or liquids and gases, from vapors, which comprises a casing having a steam inlet, a rolling float inside the casing, and a relatively small lateral outlet, the float acting to close the outlet against the outflow of steam, and to close the steam inlet to prevent return or back-flow.

15. A trap for separating liquids, or liquids and gases, from vapors, which comprises a casing having a bottom steam inlet and a lateral water outlet, and a rolling float in the casing, the parts being arranged to cause the float to close the outlet against the flow of steam and to close the inlet to prevent back-flow out of the device.

16. In a trap for separating liquids, or liquids and gases, from vapors, the combination with a casing having two orifices respectively presented horizontally and vertically, of a float normally approximately seated on both of said orifices.

17. A trap for separating liquids, or liquids and gases, from vapors, which comprises a casing, a float therein, and a relatively small lateral outlet, the float acting as a valve directly seated over the lateral outlet, and the float being freely movable to present various wearing surfaces to its said seat, and a discharge pipe leading downwardly from the outlet orifice.

18. A trap for separating liquids, or liquids and gases, from vapors, which comprises a casing provided with a lateral outlet orifice which is small relatively to the size of the float, a surface extending from the periphery of said orifice, a float adapted to roll across said extended surface so as to control the orifice, the float being operated by the rising and falling of the liquid in the casing, and a passage for air or gas leading from a higher point in the casing to a point near the periphery of the outlet orifice.

19. A trap for separating liquids, or liquids and gases, from vapors, which comprises a casing provided with a lateral outlet orifice which is small relatively to the size of the float, a surface extending from the periphery of said orifice, a float adapted to roll across said extended surface so as to control the orifice, the float being operated by the rising and falling of the liquid in the casing, and a passage for air or gas leading from a higher point in the casing to a point near the periphery of the outlet orifice, and a stop to limit the downward motion of the float.

20. A trap for separating liquids, or liquids and gases, from vapors, which comprises a casing, a discharge nozzle having an outlet orifice, and a surface extending from the periphery of said orifice, a float adapted to roll across the surface of the nozzle so as to control the orifice, the float being operated by the rising and falling of the liquid in the casing, said nozzle having a passage through it for air or gas leading from a higher point in the casing to a point near the periphery of its outlet orifice.

21. A trap for separating liquids, or liquids and gases from vapors, which comprises a casing, a discharge nozzle having an outlet orifice, and a surface extending from the periphery of said orifice, a float adapted to roll across the surface of the nozzle so as to control the orifice, the float being operated by the rising and falling of the liquid in the casing.

22. A trap for separating liquids, or liquids and gases from vapors, which comprises a casing, a discharge nozzle having an outlet orifice, and a surface extending from the periphery of said orifice, a float adapted to roll across the surface of the nozzle so as to control the orifice, the float being operated by the rising and falling of the liquid in the casing, and a cleaning-pin for cleaning the orifice, and means for moving said pin into and out of said orifice.

23. The combination of a radiator or heater adapted to be used in a steam heating system provided with a lateral outlet orifice and a rolling valve adapted to be rolled across said orifice by the rising and falling of the water of condensation so as to control the orifice and a discharge pipe leading downwardly from the outlet orifice.

24. The combination of a radiator or heater adapted to be used in a steam heating system provided with a lateral outlet orifice and a float adapted to be rolled across said orifice so as to control the same by the rising and falling of the water of condensation and a discharge pipe leading downwardly from the outlet orifice.

25. The combination of a radiator or heater adapted to be used in a steam heating system provided with a lateral outlet orifice, a surface extending from the periphery of said orifice, and a float adapted to be rolled across said surface so as to control the orifice by the rising and falling of the water of condensation.

26. The combination of a radiator or heater adapted to be used in a steam heating system provided with a lateral outlet orifice, and a spherical float adapted to be rolled across said orifice so as to control the same by the rising and falling of the water of condensation and a discharge pipe leading downwardly from the outlet orifice.

In testimony whereof, I have signed my name to this specification in the presence of two subscribing witnesses.

CHARLES S. BROWN.

Witnesses:
  JNO. R. AUST,
  W. A. TIMMONS.